R. R. DUPLER.
PULVERIZING PLOW.
APPLICATION FILED APR. 27, 1918.

1,297,117.

Patented Mar. 11, 1919.

INVENTOR.
Raymond R. Dupler,
By Owen, Owen & Crampton,
His attys.

UNITED STATES PATENT OFFICE.

RAYMOND R. DUPLER, OF MONROE, MICHIGAN.

PULVERIZING-PLOW.

1,297,117.  Specification of Letters Patent.  Patented Mar. 11, 1919.

Application filed April 27, 1918. Serial No. 231,099.

*To all whom it may concern:*

Be it known that I, RAYMOND R. DUPLER, a citizen of the United States, and a resident of Monroe, in the county of Monroe and State of Michigan, have invented a certain new and useful Pulverizing-Plow; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to agricultural implements, and particularly to a pulverizing plow.

The object of my invention is the provision of simple and efficient means for use in connection with the mold-board of a plow to pulverize or disintegrate the furrow-slices as they are turned over by the plow, thereby leaving the soil in a usable condition without necessitating a harrowing thereof after plowing.

The invention is fully described in the following specification, and while, in its broader aspect, it is capable of embodiment in numerous forms, a preferred embodiment thereof is illustrated in the accompanying drawings, in which—

Figure 1:
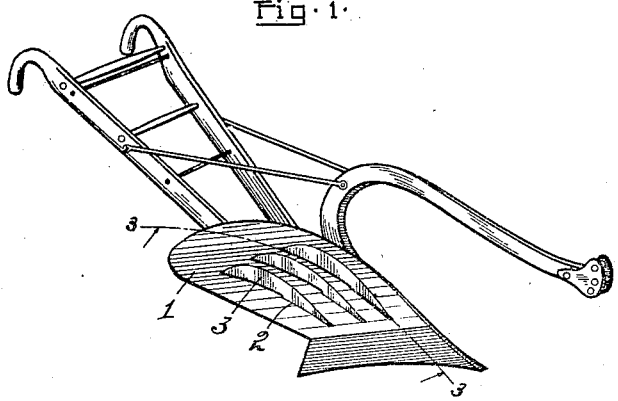
Figure 2:
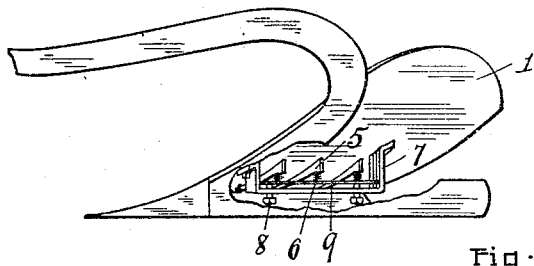
Figure 5:
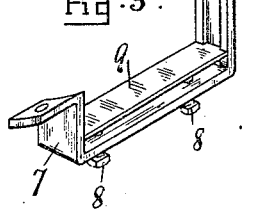
Figure 3:
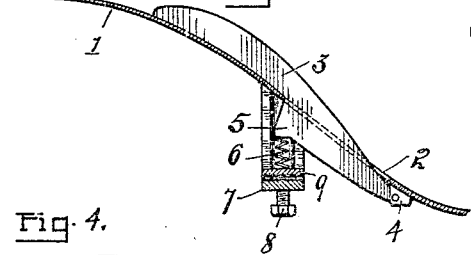
Figure 4:
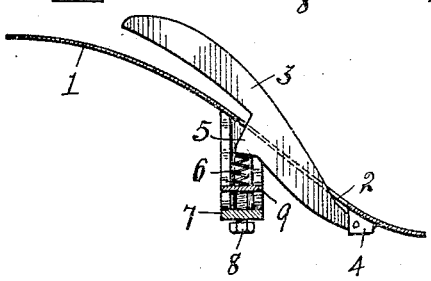

Figure 1 is a perspective view of a plow embodying my invention. Fig. 2 is a fragmentary view of the land side of the plow equipped with the invention. Figs. 3 and 4 are sections on the line 3—3 in Fig. 1, with the blades in different positions of adjustment, and Fig. 5 is a perspective view of the blade adjusting means.

Referring to the drawings, 1 designates the mold-board of a plow, and it is provided longitudinally with a plurality of transversely spaced substantially parallel slots 2. A furrow-slicing or pulverizing blade 3 is provided for each slot 2 and has its forward end portion projecting therethrough and pivoted at the forward end of the slot and at the inner side of the mold-board to a lug 4 projecting inwardly therefrom. The blades 3 preferably project a distance beyond the rear ends of the slots 2 at the outer side of the mold-board and have the notches thereof, which project through the slots, broadened or provided with transverse extensions 5 adapted to rest on respective tension springs 6 carried at the inner side of the mold-board in register with the slots.

A U-shaped bracket 7 is secured to the inner side of the mold-board in spanning relation to the rear ends of the slots 2 and has adjusting screws 8 threaded through its crown portion and bearing against a tension-plate 9, which receives the outer end thrusts of the springs 6. The plate 9 is guided for tension adjusting movements by the legs of the bracket.

The blades 3 are disposed longitudinally of the mold-board in the plane of turning movement of a furrow-slice, so that the frictional resistance of a furrow-slice against the blades is reduced to a minimum.

In the use of my pulverizing means it is apparent that the springs 6 may be adjusted to normally hold the blades forward out of stop contact with the mold-board, as shown in Fig. 4, the springs yielding to permit an inward movement of the blades when some rigid obstacle, such for instance as a stone, is encountered, or the springs may be retracted to permit a permanent seating of the blades against the mold-board, as shown in Fig. 3.

I wish it understood that my invention is not limited to any specific construction, arrangement or form of the parts, as it is capable of numerous modifications without departing from the spirit of the claims.

Having thus described my invention, what I claim as new, and desire to secure by Letters Patent, is—

1. The combination with a plow mold-board having an opening therein, of a furrow-slice cutting blade pivoted at its forward end to the mold-board and having a portion projecting inward through said opening, and means carried at the inner side of the mold-board and forming a yielding seat for said inwardly projecting portion of the blade.

2. The combination with a plow mold-board having an opening therein, of a furrow-slice cutting blade pivoted at its forward end to the mold-board and having a portion projecting inward through said opening, and means carried at the inner side of the mold-board and forming a yielding seat for said inwardly projecting portion of the blade, said means being adjustable to vary the tension thereof on the blade.

3. The combination with a plow mold-board having a longitudinally extending slot therein, of a furrow-slice cutting blade projecting inward through said slot and pivoted to the inner side of the mold-board adjacent to the forward end of the slot, and adjustable means forming a yielding seat for said blade at the inner side of the mold-board.

4. The combination with a plow mold-board having a longitudinally extending slot therein, of a furrow-slice cutting blade having its forward end portion projecting inward through said slot and pivoted to the inner side of the mold-board, a bracket carried by the mold-board at its inner side, and an adjustable spring seat for the inward thrust of said blade carried by said bracket.

5. The combination with a plow mold-board having a plurality of longitudinally extending slots therein, of furrow-slice cutting blades pivoted at their forward ends to the inner side of the mold-board at the forward end portions of said slots and projecting outward through respective slots, and means carried at the inner side of the mold-board and forming spring-seats for the blades to resist an inward movement thereof relative to the mold-board.

6. The combination with a plow mold-board having a plurality of longitudinally extending slots therein, of a furrow-slice cutting blade for each slot projecting at its forward end inward through the respective slot and pivoted to the inner side of the mold-board, a bracket secured to the inner side of the mold-board in spanning relation to said slots, a tension plate movably carried by said bracket, a coiled compression spring disposed between each blade and said plate to resist an inward movement of the blade, and plate adjusting means carried by the bracket.

7. The combination with a plow mold-board having an opening therein, of a furrow-slice cutting blade pivoted at its forward end to the mold-board and having a portion projecting rearward through said opening, and means acting on said blade in the rear of the mold-board to yieldingly urge an outward movement of the blade relative to the mold-board.

8. The combination with a plow mold-board having an opening therein, of a furrow-slice cutting blade, having its forward end portion projecting through said opening and pivoted to the mold-board at the rear side thereof, and spring means disposed at the rear side of the mold-board and acting on said blade to urge an outward swinging movement of the portion of the blade disposed at the forward side of the mold-board.

9. The combination with a plow mold board having an opening therein, of a furrow slice cutting blade extending lengthwise of the mold board and having its forward end portion projecting through said opening and pivoted adjacent to the forward end of said opening for adjusting movements to vary the depth of cut, and means at the rear of the mold board coacting with the portion of the blade projecting therethrough and operable to adjust said blade.

In testimony whereof, I have hereunto signed my name to this specification.

RAYMOND R. DUPLER

Copies of this patent may be obtained for five cents each, by addressing the "Commissioner of Patents, Washington, D. C."